UNITED STATES PATENT OFFICE.

HENRY DREYFUS, OF BASEL, SWITZERLAND.

UNINFLAMMABLE CELLULOID SUBSTITUTE.

1,181,860. Specification of Letters Patent. Patented May 2, 1916.

No Drawing. Application filed November 12, 1914. Serial No. 871,834.

*To all whom it may concern:*

Be it known that I, HENRY DREYFUS, a citizen of the Republic of Switzerland, residing at Basel, Switzerland, have invented certain new and useful Improvements in Uninflammable Celluloid Substitutes, of which the following is a specification.

The present invention relates to the manufacture of celluloid substitutes, particularly those which are less inflammable than those composed of niter cellulose and camphor.

The present application is a continuation in part of my prior U. S. application No. 652,445, filed October 2, 1911.

In accordance with the present invention, I use as camphor substitutes the aromatic side chain alcohols, or their substitution products, such as benzyl alcohol $$C_6H_5-CH_2OH,$$

or the chlorin substitution products of such alcohols for example $$(o-m-p)Cl-C_6H_4-CH_2OH$$

benzhydrols, such as diphenyl carbinol,

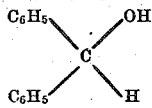

substitution products of the bodies indicated above, such as the chlorin, or other halogen, or nitro, or chlor-nitro substitution products and homologues thereof, such as the chlor-benzhydrols or ethoxybenzylalcohol, methoxylbenzylalcohol, phenoxybenzylalcohol, etc., or of mixtures of two or more of the products indicated above, or mixtures of one or more of the mixtures indicated above with other camphor substitutes.

The cellulose esters which I preferably employ, in making the celluloid substitutes, in accordance with the present invention, are those produced in accordance with the process described in my prior application 652,442, filed October 2, 1911, and in my prior application 782,530, filed August 1, 1913. The cellulose esters of my copending application 652,442 are distinguished from all cellulose esters heretofore known, in that while they are insoluble in chloroform, they are very soluble in alcohol-tetrachlorethane or alcohol-chloroform, and certain of the esters are also soluble in alcohol-benzene, and in acetone. These esters are also soluble in hot dilute alcohol, say 75% the solutions therein giving upon cooling perfectly clear and transparent films, which are characterized by a very great flexibility and elasticity. Unless coloring matters have been incorporated, during the process of manufacture, the films will be entirely colorless.

The procedure of making celluloid like bodies is executed in the usual manner in employing restricted quantities of these bodies in connection with the cellulose acetate so for example 20% or 30 or 50% or 100% calculated upon the weight of the employed cellulose acetate and in employing at the same time, as dissolving agents, solvents of low boiling points, such as acetone, methyl acetate, or mixtures thereof with alcohol, or other readily volatile solvents. The working up is carried out in the same manner as with ordinary celluloid containing camphor, that is to say in malaxation rollers, presses and the like. In addition to the solvents above specified, other camphor substitutes may be used in the preparation of the celluloid substitutes constituting the present invention, such as those previously known, in order to produce special effects. Also filling substances may be added if desired.

The procedure for the preparation of the solutions, with solvents of low boiling points, and with the particular camphor substitutes, is shown by the following examples:—

Example I: 200 parts of cellulose acetate, having the solubilities above referred to, are dissolved in from 800 parts up to 1600 parts of acetone, or methyl acetate, or methyl acetate and alcohol, together with from 50 to 100 parts or even up to 200 parts of benzyl alcohol, or of one or more of the substances above referred to. The solution thus obtained is worked up in the usual manner for celluloid, varnishes, coatings, etc.

Example II: 200 parts of cellulose acetate, having the solubilities above referred to, are dissolved in 1000 to 2000 parts of benzylalcohol and worked up in the usual manner as solution.

Example III: 200 parts of cellulose acetate referred to are kneaded with 100 to 200 parts of acetone or methylacetate, or these bodies with alcohol and after having added 50 to 100 parts of benzylalcohol or chlorobenzylalcohol or ethoxybenzylalcohol or diphenylcarbinol or mixtures thereof, and the mixture is then worked up in the usual manner in malaxators, rollers, etc., as generally applied in celluloid industry. Also other camphor substitutes may be added particularly such as triphenylphosphate manol, etc., filling substances, coloring substances, that is to say, substances giving various effects.

Example IV: 100 parts of cellulose acetate having the solubilities above referred to are dissolved in a heated mixture of equal volumes of alcohol and trichlorethane together with 50 parts composed of diphenyl carbinol and benzylalcohol or one of its halogen substitution products, or ethoxybenzylalcohol or phenoxybenzyl alcohol, and is thereafter worked up in the usual manner.

If desired in either of the above examples, substances may be added, such softening or flexibility-increasing substances, and particularly oils, such as camphor oil, being particularly suitable.

While I have referred in the above examples, to the use of cellulose acetates having certain solubilities, namely those acetates produced in accordance with the processes described in my two prior United States applications above referred to, I call attention to the fact that other cellulose acetates may be employed, although less advantageously, and also instead of cellulose acetates, other cellulose esters may be employed, such as cellulose propionates, etc. While I have referred particularly to the use of certain liquid solvents of low boiling points, I call attention to the fact that the invention is not limited to the use of these particular solvents, since other solvents may be employed and particularly also mixtures containing one or more of the bodies, such as ethylchlorid, methylene chlorid, ethylidenechlorid, methylalcohol and its homologues, alcohol, chloroform, tetrachlorethane, anisol, trichlorethylene, and others. I also call attention to the fact that various other camphor substitutes may be used, in addition to the camphor substitutes above mentioned, particularly methyl-acetanilid, etherified phenols, and their homologues, phenones, triphenylphosphate. Either one or more of such substances may be added to the mixtures described.

The cellulose substitutes made in accordance with this invention are less inflammable than ordinary camphor, and are more stable than ordinary camphor, since the substances used, as camphor substitutes are more stable than camphor and are less volatile than camphor. These substances also have the advantage over most of the camphor substitutes heretofore employed, in that they are odorless, or possess an agreeable odor, as distinguished from phenols, which have a disagreeable odor, and these camphor substitutes have no action upon cellulose esters, other than the solvent action. The celluloid substitutes accordingly are perfectly stable and unlike many of the previous celluloid substitutes, in that they do not darken with age.

What I claim is:—

1. A celluloid substitute comprising a cellulose acetate and an aromatic side chain alcohol.

2. A celluloid substitute comprising a cellulose acetate substantially insoluble in chloroform and in tetrachlorethane, but readily soluble in chloroform-alcohol, and in tetrachlorethanealcohol, and an aromatic side chain alcohol.

3. A celluloid substitute comprising a cellulose acetate, an aromatic side chain alcohol and an oil capable of increasing the plasticity of the cellulose acetate.

4. A celluloid substitute comprising a cellulose acetate soluble in acetone and an aromatic side chain alcohol.

5. A celluloid substitute comprising a cellulose acetate and an aromatic side chain alcohol substituted in the nucleus.

6. A celluliod substitute comprising a cellulose acetate and a plurality of aromatic side chain alcohols.

7. A cellulose substitute comprising a cellulose acetate soluble in acetone and an aromatic side chain alcohol substituted in the nucleus.

8. A celluloid substitute comprising a cellulose acetate and a solvent including a nucleus substitution product of an aromatic side chain alcohol.

In testimony whereof, I have hereunto subscribed my name.

Dr. HENRY DREYFUS.

Witnesses:
 Arnold Zuber,
 Wm. Wilson.